United States Patent
Cypher et al.

(10) Patent No.: US 8,516,199 B2
(45) Date of Patent: Aug. 20, 2013

(54) BANDWIDTH-EFFICIENT DIRECTORY-BASED COHERENCE PROTOCOL

(75) Inventors: Robert E. Cypher, Saratoga, CA (US); Haakan E. Zeffer, Santa Clara, CA (US); Brian J. McGee, San Jose, CA (US); Bharat K. Daga, Fremont, CA (US)

(73) Assignee: Oracle America, Inc., Redwood Shores, CA (US)

( * ) Notice: Subject to any disclaimer, the term of this patent is extended or adjusted under 35 U.S.C. 154(b) by 758 days.

(21) Appl. No.: 12/405,483

(22) Filed: Mar. 17, 2009

(65) Prior Publication Data

US 2010/0241814 A1 Sep. 23, 2010

(51) Int. Cl.
*G06F 12/00* (2006.01)
(52) U.S. Cl.
USPC .... 711/141; 711/108; 711/144; 711/E12.001; 711/E12.037

(58) Field of Classification Search
USPC ........... 711/108, 141, 144, E12.001, E12.037
See application file for complete search history.

(56) References Cited

U.S. PATENT DOCUMENTS

| 2005/0160430 A1* | 7/2005 | Steely et al. | 719/310 |
| 2007/0147250 A1* | 6/2007 | Druke et al. | 370/235 |

* cited by examiner

*Primary Examiner* — Jasmine Song
(74) *Attorney, Agent, or Firm* — Park, Vaughan, Fleming & Dowler, LLP

(57) ABSTRACT

Some embodiments of the present invention provide a system that processes a request for a cache line in a multiprocessor system that supports a directory-based cache-coherence scheme. During operation, the system receives the request for the cache line from a requesting node at a home node, wherein the home node maintains directory information for all or a subset of the address space which includes the cache line. Next, the system performs an action at the home node, which causes a valid copy of the cache line to be sent to the requesting node. The system then completes processing of the request at the home node without waiting for an acknowledgment indicating that the requesting node received the valid copy of the cache line.

17 Claims, 4 Drawing Sheets

BANDWIDTH-EFFICIENT DIRECTORY-BASED COHERENCE PROTOCOL

BACKGROUND

1. Field

The present invention generally relates to the design of processors in computer systems. More specifically, the present invention relates to a bandwidth-efficient, directory-based coherence protocol for a shared memory multiprocessor system.

2. Related Art

As shared memory multiprocessor systems increase in size, it is becoming impractical to use broadcast-based cache-coherence techniques because broadcast-based techniques require increasing amounts of inter-processor communication bandwidth as the number of processors increases. This has led to the development of directory-based cache-coherence protocols for larger shared memory multiprocessor systems. Directory-based protocols make use of a directory to maintain information about locations of readable and writable copies of cache lines. This location information allows efficient point-to point communications to be used to ensure coherence, instead of less-efficient broadcast communications.

Directory information is typically partitioned between processor nodes in the multiprocessor system, so that each processor node is responsible for maintaining directory information for cache lines in a subset of the address space in the shared memory multiprocessor system. The responsible node for a specific cache line is referred to as the "home node" for the cache line. The home node for a cache line services requests for the cache line from requesting nodes, wherein a valid copy of the cache line may be located in another processor node, which is referred to as a "slave node."

In a typical directory-based system, the directory information is not perfect, because it provides a conservative representation of which processors may have a readable or writable copy of a cache line. For example, if a protocol supports silent eviction of shared cache lines, or if the directory uses a coarse bit-mask to indicate sharers, the directory could indicate that processors are potential sharers in situations in which the processors are not actual sharers. In another example, a directory could indicate a potential sharer or owner which is not an actual sharer or owner if there is a race between the cache line being evicted (and, if dirty, being written back) by a processor while that processor is being accessed as a slave during a request for the same cache line by another processor.

In many directory-based coherence protocols (such as in a "blocking" protocol with unordered coherence links) each transaction is terminated by sending an acknowledgment (ACK) message from the requesting node to the home node indicating that the requesting node has received a copy of the cache line. In such protocols, the system delays processing subsequent requests for the same cache line until such an ACK or other message has been received. However, the use of such ACK messages before completing a transaction increases the bandwidth required to maintain coherence. Moreover, the requirement that the home node must wait for such ACK messages increases the time that resources at the home node must be allocated to processing the given transaction. In order to decrease such bandwidth requirements and to improve resource utilization, it is desirable to eliminate the requirement that all transactions end with an ACK (or other message) to the home node.

Unfortunately, eliminating such ACK messages can lead to forward-progress problems. More specifically, if a processor requests access rights to a cache line and then receives a slave message which removes the access rights prior to receiving the requested access rights, the requesting processor may not be able to make forward progress without having to enforce ordering constraints on the coherence links or between virtual channels.

Hence, what is needed is a system which provides a directory-based cache-coherence scheme without the need for such ACK messages.

SUMMARY

Some embodiments of the present invention provide a system that processes a request for a cache line in a multiprocessor system that supports a directory-based cache-coherence scheme. During operation, the system receives the request for the cache line from a requesting node at a home node, wherein the home node maintains directory information for all of the address space, or a subset of the address space which includes the cache line. Next, the system performs an action at the home node, which causes a valid copy of the cache line to be sent to the requesting node. The system then completes processing of the request at the home node without waiting for an acknowledgment indicating that the requesting node received the valid copy of the cache line.

In some embodiments, causing the valid copy of the cache line to be sent to the requesting node involves sending the valid copy of the cache line from the home node to the requesting node.

In some embodiments, causing the valid copy of the cache line to be sent to the requesting node involves sending a forward message from the home node to a slave node, wherein the slave node has a valid copy of the cache line, and wherein the forward message causes the slave node to send the valid copy of the cache line to the requesting node.

In some embodiments, if the requesting node receives an invalidation for a requested cache line, and then receives a copy of the requested cache line, the requesting node ignores the copy of the requested cache line and resends the request.

In some embodiments, if one or more unsuccessful requests have been sent for the cache line, resending the request involves sending a special request to the home node that guarantees forward progress for the request.

In some embodiments, while processing the special request, the home node causes a valid copy of the cache line to be sent to the requesting node, and then waits to receive an acknowledgment that the requesting node received the valid copy of the cache line before completing processing of the request.

In some embodiments, completing processing of the request involves removing an entry for request from a content-addressable memory (CAM) at the home node, wherein the entry contains state information for the request.

In some embodiments, prior to receiving the request for the cache line at the home node, the system performs a memory access which is directed to the cache line at the requesting node, wherein the memory access generates a cache miss. In response to the cache miss, the system sends the request for the cache line to the home node.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Coherence Communications

Figure 1A:
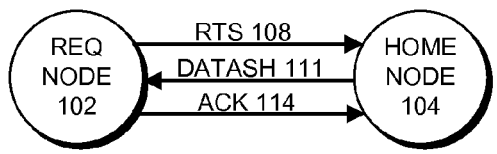
FIG. 1A illustrates exemplary coherence communications between nodes in a conventional shared-memory multiprocessor system.
Figure 1B:
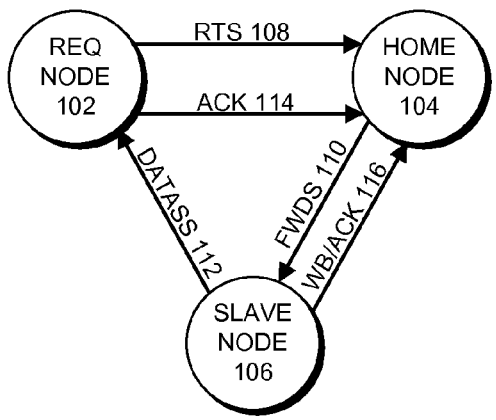
FIG. 1B illustrates additional exemplary coherence communications between nodes in a conventional shared-memory multiprocessor system.

FIGS. 1A and 1B illustrate exemplary coherence communications between nodes in a conventional shared-memory multiprocessor system. During an exemplary coherence operation, such as a read-to-share (RTS), a requesting node 102 sends an RTS request 108 to a home node 104 in order to obtain a copy of a cache line in the shared state. (Note that the present invention can also be applied to other types of coherence operations, such as read-to-own (RTO) operations.)

Because each node in the multiprocessor system maintains directory information for a specific subset of addresses, the requesting node can determine the home node for a cache line by simply examining the address of the cache line. Home node 104 looks up directory information for the cache line to determine which node (or nodes) in the multiprocessor system holds a valid copy of the cache line. If a node other than home node 104 holds a valid copy of the cache line, this node is referred to as a "slave node," for example, such as slave node 106 in FIG. 1B.

Note that there exist two commonly used techniques for maintaining directories, and either of these techniques can be used with the present invention. (1) The first technique, which is described in this disclosure, maintains directory information for every cache line that a home node is responsible for. (2) In contrast, the second technique maintains directory information at the home node for only cache lines which reside in caches in the multiprocessor system. For example, the home node can maintain copies of cache line tags from all processors which hold copies of cache lines associated with the home node.

Referring back to FIG. 1A, during a cache-coherence operation, such as an RTS, a requesting node 102 sends an RTS request 108 to home node 104. (Under a blocking directory scheme, this request locks the associated directory entry so that no other transactions can occur for the same directory entry.) If a valid copy of the cache line resides on home node 104, the system performs a two-hop protocol, wherein the cache line (DATASH 111) is sent from home node 104 to requesting node 102. Next, requesting node 102 sends an acknowledgment 114 back to home node 104. This acknowledgment 114 allows home node 104 to complete the transaction (which, for example, can involve unlocking the corresponding directory entry for the request in a blocking directory scheme).

The present invention modifies this conventional protocol by eliminating the need for acknowledgment message 114 in many situations. This frees up resources required to keep track of the associated transaction, and also reduces the communication bandwidth required for acknowledgment message 114.

Referring to FIG. 1B, in the case where a valid copy of the cache line does not exist at home node 104, but instead resides on slave node 106, the system performs a three-hop protocol. During this three-hop protocol, home node 104 send a FWDS message 110 to slave node 106. In response to this FWDS message, slave node 106 forwards the cache line (DATASS 112) to requesting node 102. Requesting node 102 then sends an acknowledgment 114 back to home node 104. Slave node 106 can also send a write-back message 116 to home node to update the copy of the cache line at home node 104. (Note that if the cache line is held in the exclusive state, slave node 106 can instead send an acknowledgment message to home node 104.)

Node Structure

Figure 2:
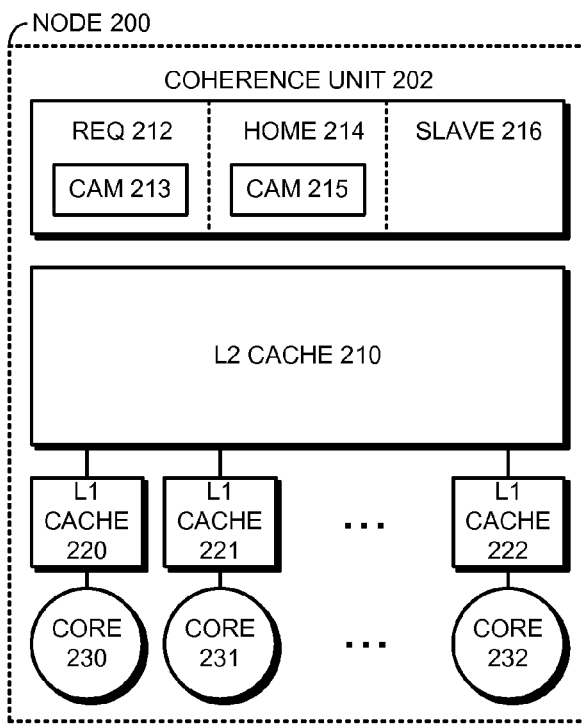
FIG. 2 illustrates the structure of a node in a multiprocessor system in accordance with an embodiment of the present invention.

FIG. 2 illustrates the structure of an exemplary node 200 in a multiprocessor system in accordance with an embodiment of the present invention. This multiprocessor system includes a plurality of nodes which are coupled together through some type of communication network. This exemplary node includes one or more processor cores 230-232, which are coupled to L1 caches 220-222, respectively. These L1 caches 220-222 share an L2 cache 210.

Node 200 includes a coherence unit 202, which coordinates communications to maintain coherence between copies of cache lines in the multiprocessor system. Coherence unit 202 can be conceptually divided into three logical blocks, which are associated with the three different roles node 200 can play in the multiprocessor system. More specifically, coherence unit 202 includes a request portion 212, which handles coherence traffic in situations when node 200 functions as a requesting node. Coherence unit 202 also includes a home portion 214, which handles coherence traffic in situations when node 200 functions as a home node. Coherence unit 202 additionally includes a slave portion 216, which handles coherence traffic in situations when node 200 functions as a slave node.

The requesting portion 212 includes a content-addressable memory (CAM) 213, which enables the system to look up state information for pending coherence transactions for which node 200 is the requesting node. In particular, CAM 213 allows the system to look up an entry for an outstanding request based on an address of a cache line. Each entry in CAM 213 is associated with a finite state machine (FSM) which keeps track of progress for the request. Similarly, home portion 214 includes a CAM 215, which contains state information for pending coherence transactions for which node 200 is the home node. The slave portion does not maintain any such state information, so it does not have a corresponding CAM.

Node 200 functions as a home node for a subset of the shared address space in the multiprocessor system. Hence, node 200 stores directory information for every cache line that falls within the subset of the address space that node 200 is responsible for. (Note that the subset can possibly include the entire address space.)

Although the present invention is described in terms of the specific node structure illustrated in FIG. 2, the present invention can be applied to different node structures with different numbers of processors and different numbers of caches. For example, in an alternative embodiment, node 200 can include a single processor core and a single cache.

Operations at Requesting Node

Figure 3:
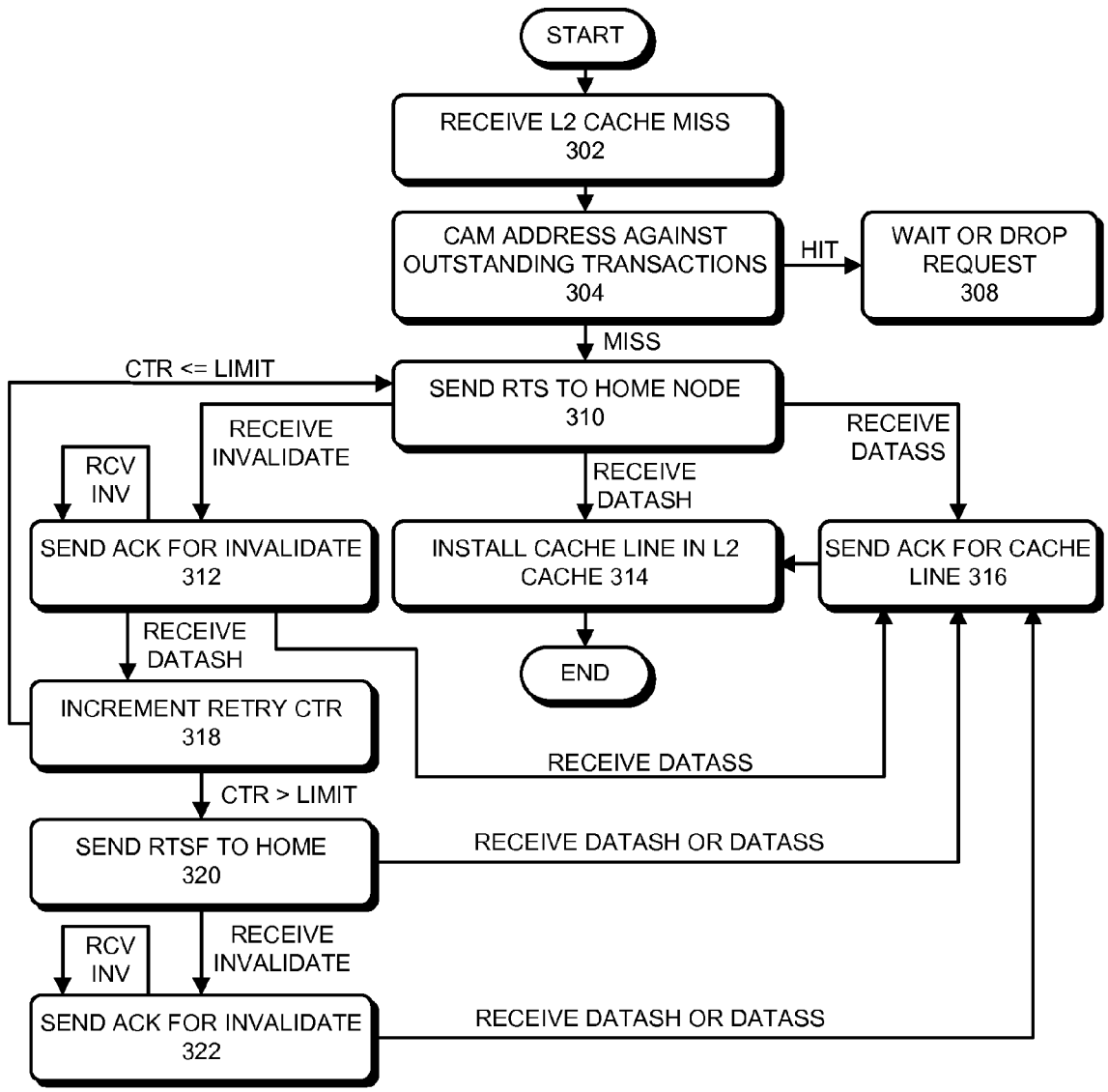
FIG. 3 presents a flow chart illustrating how a cache miss is processed at a requesting node in accordance with an embodiment of the present invention.

FIG. 3 presents a flow chart illustrating how a cache miss is processed at a requesting node 102 in accordance with an embodiment of the present invention. The process starts when the system receives an L2 cache miss during a memory access at requesting node 102 (step 302). The system first performs a CAM search based on the address of the memory access against all outstanding transactions for requesting node 102, which, for example, can involve using CAM 213 in FIG. 2 (step 304). If this CAM search results in a hit, there exists an outstanding request which is directed to the same cache line. In this case, the system can wait for this preceding request to complete, or the system can alternatively drop the request (step 308).

On the other hand, if the CAM search results in a miss, there is no outstanding request for the cache line. In this case, the system sends a coherence request, such as an RTS, to the home node 104 for the cache line (step 310). After this request is sent, a number of events can take place. If the requesting node 102 receives the requested cache line directly from home node 104 (as indicated by DATASH), requesting node 102 installs the cache line in its L2 cache (step 314). (Note that in this case requesting node 102 does not send an acknowledgment back to home node 104.)

On the other hand, if requesting node 102 receives the requested cache line from a slave node 106 (as indicated by DATASS), requesting node 102 first sends an acknowledgment to the home node indicating that the cache line was successfully received (step 316). Next, requesting node 102 installs the cache line in its L2 cache (step 314).

Finally, if at step 310 requesting node 102 receives an invalidation for the requested cache line, requesting node 102 returns an acknowledgment for the invalidation (step 312). After this acknowledgment is sent, a number of events can take place. If requesting node 102 receives a subsequent invalidation for the requested cache line, requesting node 102 returns to step 312 and returns an acknowledgment for the subsequent invalidation.

On the other hand, if requesting node 102 receives the requested cache line from a slave node 106 (as indicated by DATASS), requesting node 102 sends an acknowledgment to home node 104 indicating that the cache line was successfully received (step 316). Next, requesting node 102 installs the cache line in its L2 cache (step 314).

Finally, if the requesting node 102 receives the requested cache line directly from home node 104 (as indicated DATASH), there is a potential race condition between the returned cache line and the preceding invalidation for the cache line. Consequently, requesting node 102 cannot guarantee that the returned cache line is valid, and hence does not install the returned cache line. Instead, requesting node 102 increments a retry counter for the cache line (step 318). If this retry counter is less than or equal to a "retry limit," the system returns to step 310 to resend the coherence request to home node 104.

On the other hand, if the retry counter exceeds the retry limit, requesting node 102 sends a special coherence request (such as an RTSF) to home node 104 (step 320). This special coherence request guarantees forward progress by requiring that home node 104 receive an acknowledgment from requesting node 102 before completing a two-hop protocol. If, in response to the special coherence request, requesting node 102 receives the requested cache line from the home node 104 or a slave node 106 (either DATASH or DATASS), requesting node 102 sends an acknowledgment to home node 104 indicating that the cache line was successfully received (step 316). Next, requesting node 102 installs the cache line in its L2 cache (step 314).

On the other hand, if at step 320 requesting node 102 receives an invalidation for the requested cache line, requesting node 102 returns an acknowledgment for the invalidation (step 322). If requesting node 102 receives an subsequent invalidation for the requested cache line, requesting node 102 returns to step 322 and returns an acknowledgment for the subsequent invalidation. On the other hand, if requesting node 102 receives the requested cache line from the home node 104 or a slave node 106 (either DATASH or DATASS), requesting node 102 sends an acknowledgment to home node 104 indicating that the cache line was successfully received (step 316). Next, requesting node 102 installs the cache line in its L2 cache (step 314).

Servicing a Request at Home Node

Figure 4:
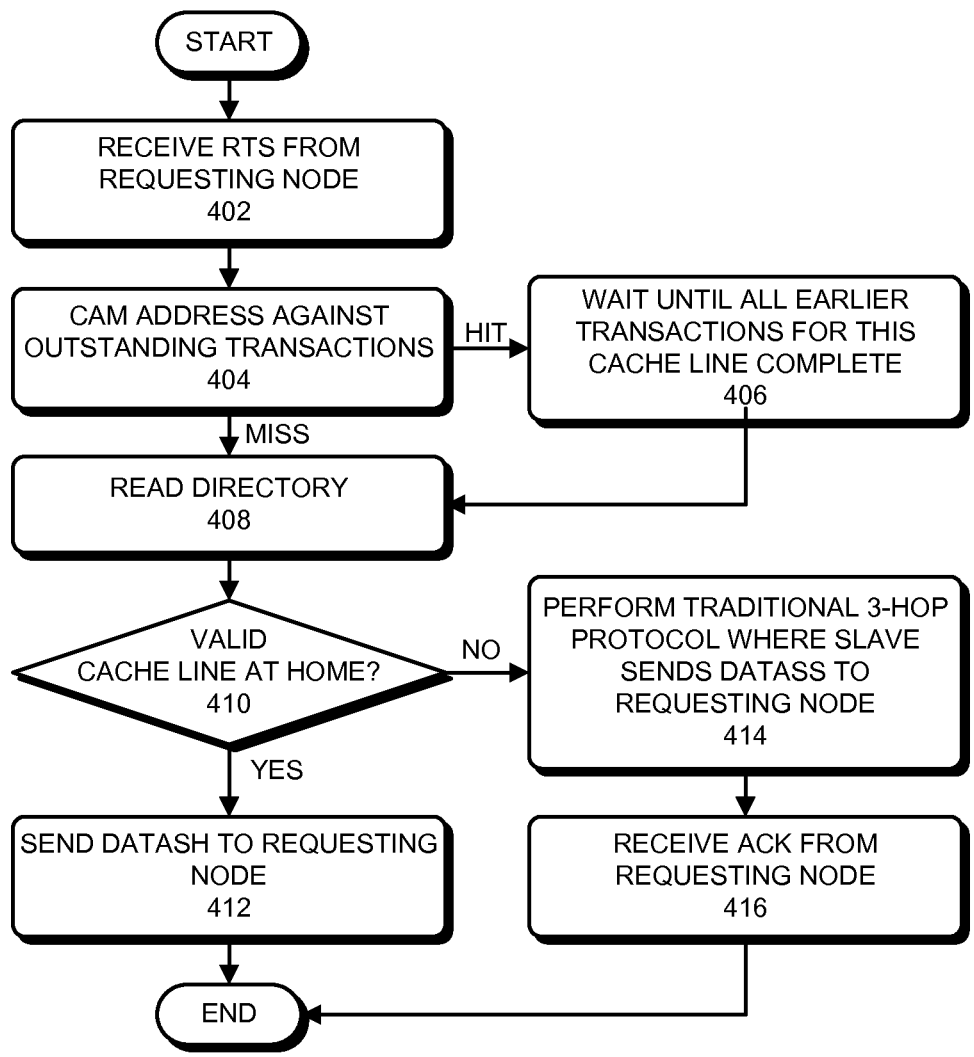
FIG. 4 presents a flow chart illustrating how a request for a cache line is processed at a home node in accordance with an embodiment of the present invention.

FIG. 4 presents a flow chart illustrating how a request for a cache line is processed at a home node in accordance with an embodiment of the present invention. This process starts when the home node 104 receives a request, such as an RTS, from a requesting node 102 (step 402). The system first performs a CAM search based on the address for the request against outstanding transactions for home node 104, which, for example, can involve using CAM 215 in FIG. 2 (step 404). If this CAM search results in a hit, there exists an outstanding request which is being serviced by home node 104 and is directed to the same cache line. In this case, the system waits for this outstanding request and all earlier outstanding requests for the same cache line to complete (step 406). After these outstanding requests complete, or if there was a CAM miss at step 404, the system reads directory information for the request to determine where copies of the associated cache are located (step 408). The system then examines the directory information to determine whether there exists a valid copy of the cache line at home node 104 (step 410). If so, the system sends the copy of the cache line (DATASH) to requesting node 102 from home node 104 (step 412). In this case, home node 104 completes the transaction without waiting for an acknowledgment that requesting node 102 successfully received the cache line.

On the other hand, if at step 410 a valid copy of the cache line does not exist at home node 104, the system performs a traditional three-hop coherence protocol, wherein a slave node 106 sends a copy of the cache line (DATASS) to requesting node 102. At the end of this three-hop protocol, home node 104 waits to receive an acknowledgment from requesting node 102 (step 416), indicating requesting node 102 successfully received the copy of the cache line, before completing the transaction. This prevents home node 104 from generating an invalidation for the cache line until the cache line has been successfully installed at the requesting node, thus guaranteeing forward progress.

Servicing a Request that Guarantees Forward Progress at Home Node

Figure 5:
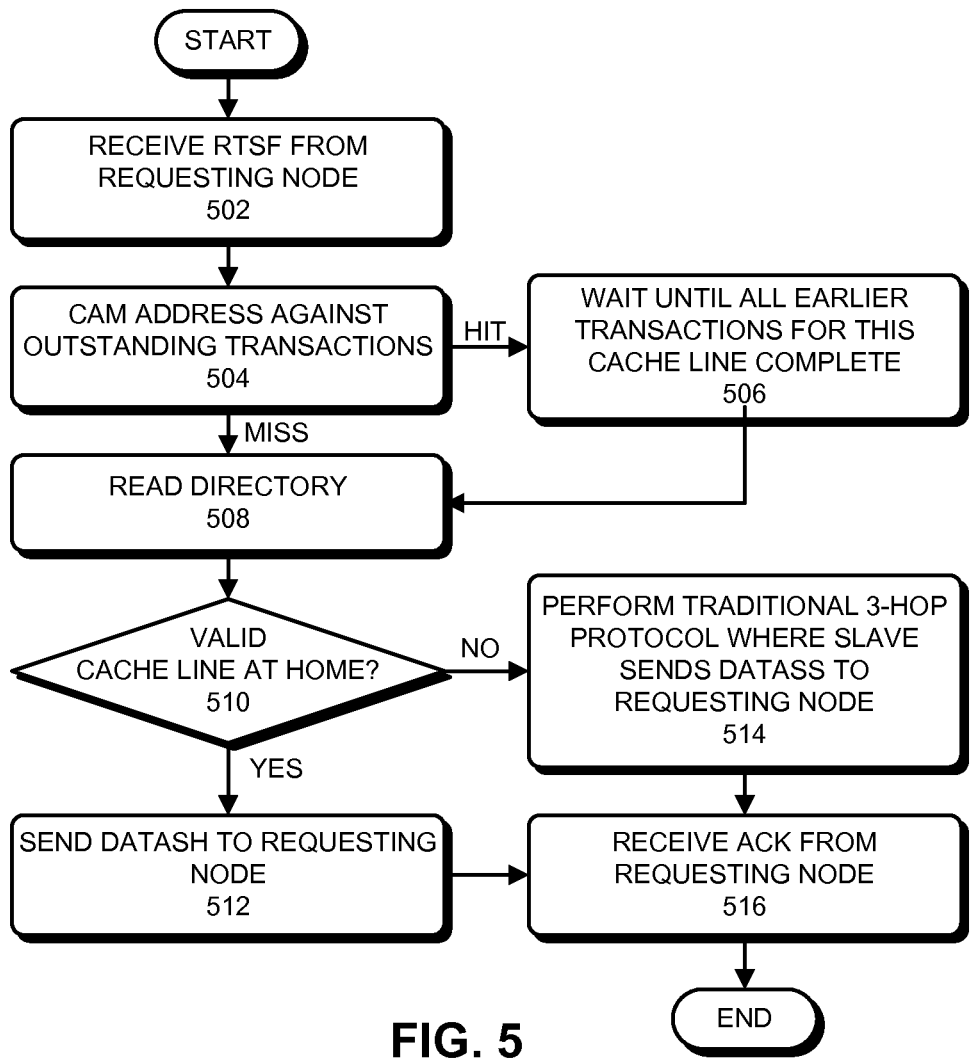
FIG. 5 presents a flow chart illustrating how a request for a cache line which guarantees forward progress is processed at a home node in accordance with an embodiment of the present invention.

FIG. 5 presents a flow chart illustrating how a request for a cache line which guarantees forward progress is processed at a home node 104 in accordance with an embodiment of the present invention. This process starts when home node 104 receives a special request which is processed in a manner that guarantees forward progress, such as an RTSF, from a requesting node 102 (step 502). This request is processed in almost the same manner as in FIG. 4, except that in the case of a two-hop protocol ("yes" at step 510), after sending the copy of the cache line (DATASH) to requesting node 102 from home node 104 in step 512, the system waits to receive an acknowledgment from requesting node (step 516) before completing the transaction.

Conclusion

The present invention provides a technique for eliminating the need for ACK messages during common operations in a directory-based cache-coherence protocol. Additionally, the present invention can revert to a conventional directory-based coherence scheme that uses ACK messages during certain situations to guarantee forward progress. Moreover, the present invention does not require ordering properties between different messages, nor does it require that messages from slave processors to requesting processors go through the home processor. Hence, in comparison to conventional directory-based coherency protocols, the present invention (1) lowers coherence traffic, (2) lowers utilization of the FSM at a home node, and (3) reduces latency from one transaction to the next for the same cache line.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for processing a request for a cache line in a multiprocessor system that supports a directory-based cache-coherence scheme, comprising:
   receiving the request for the cache line from a requesting node at a home node, wherein the home node maintains directory information for all or a subset of the address space which includes the cache line;
   performing an action at the home node that causes a valid copy of the cache line to be sent to the requesting node; and
   when causing the valid copy of the cache line to be sent to the requesting node involves sending the valid copy of the cache line from the home node to the requesting node, completing processing of the request at the home node without waiting for an acknowledgment indicating that the requesting node received the valid copy of the cache line, wherein the requesting node does not send an acknowledgment indicating that the requesting node received the valid copy of the cache line when receiving the copy of the cache line from the home node.

2. The method of claim 1, further comprising, when causing the valid copy of the cache line to be sent to the requesting node involves sending a forward message from the home node to a slave node, wherein the slave node has a valid copy of the cache line, and wherein the forward message causes the slave node to send the valid copy of the cache line to the requesting node, waiting for an acknowledgment indicating that the requesting node received the valid copy of the cache line before completing processing of the request.

3. The method of claim 1, wherein if the requesting node receives an invalidation for a requested cache line, and then receives a copy of the requested cache line from the home node, the requesting node ignores the copy of the requested cache line and resends the request.

4. The method of claim 3, wherein if one or more unsuccessful requests have been sent for the cache line, resending the request involves sending a special request to the home node that guarantees forward progress for the request.

5. The method of claim 4, wherein while processing the special request, the home node causes a valid copy of the cache line to be sent to the requesting node, and then waits to receive an acknowledgment that the requesting node received the valid copy of the cache line before completing processing of the request.

6. The method of claim 1, wherein completing processing of the request involves removing an entry for request from a content-addressable memory (CAM) at the home node, wherein the entry contains state information for the request.

7. The method of claim 1, wherein prior to receiving the request for the cache line at the home node, the method further comprises:
   performing a memory access which is directed to the cache line at the requesting node, wherein the memory access generates a cache miss; and
   in response to the cache miss, sending the request for the cache line to the home node.

8. A multiprocessor system that supports a directory-based cache-coherence scheme, comprising:
   a plurality of processor nodes;
   wherein a given node in the plurality of processor nodes is configured to act as a home node for all of the cache lines or a subset of the cache lines which fall in a specific subset of addresses; and
   wherein the given node is configured to:
      receive a request for a cache line from a requesting node;
      perform an action which causes a valid copy of the cache line to be sent to the requesting node; and
      when causing the valid copy of the cache line to be sent to the requesting node involves sending the valid copy of the cache line to the requesting node from the given node, complete processing of the request without waiting for an acknowledgment indicating that the requesting node received the valid copy of the cache line, wherein the requesting node does not send an acknowledgment indicating that the requesting node received the valid copy of the cache line when receiving the copy of the cache line from the given node.

9. The multiprocessor system of claim 8, wherein, when causing the valid copy of the cache line to be sent to the requesting node involves the given node sending a forward message to a slave node, wherein the slave node has a valid copy of the cache line, and wherein the forward message causes the slave node to send the valid copy of the cache line to the requesting node, the given node is configured to wait for an acknowledgment indicating that the requesting node received the valid copy of the cache line before completing processing of the request.

10. The multiprocessor system of claim 8, wherein if the requesting node receives an invalidation for a requested cache line, and then receives a copy of the requested cache line from the home node, the requesting node is configured to ignore the copy of the requested cache line and resend the request.

11. The multiprocessor system of claim 10, wherein if one or more unsuccessful requests have been sent for the cache line, while resending the request, the requesting node is configured to send a special request to the home node that guarantees forward progress for the request.

12. The multiprocessor system of claim 11, wherein while processing the special request, the given node causes a valid copy of the cache line to be sent to the requesting node, and then waits to receive an acknowledgment that the requesting node received the valid copy of the cache line before completing processing of the request.

13. The multiprocessor system of claim 8, wherein while completing processing of the request, the given node is configured to remove an entry for request from a content-addressable memory (CAM), wherein the entry contains state information for the request.

14. The multiprocessor system of claim 8, wherein if a memory access which is directed to a cache line generates a cache miss, the requesting node is configured to send a request for the cache line to a home node for the cache line.

15. A non-transitory computer-readable storage medium storing instructions that when executed by a computer cause the computer to perform a method for processing a request for a cache line in a multiprocessor system that supports a directory-based cache-coherence scheme, the method comprising:

receiving the request for the cache line from a requesting node at a home node, wherein the home node maintains directory information for all or a subset of the address space which includes the cache line;

performing an action at the home node that causes a valid copy of the cache line to be sent to the requesting node; and when causing the valid copy of the cache line to be sent to the requesting node involves sending the valid copy of the cache line from the home node to the requesting node, completing processing of the request at the home node without waiting for an acknowledgment indicating that the requesting node received the valid copy of the cache line, wherein the requesting node does not send an acknowledgment indicating that the requesting node received the valid copy of the cache line when receiving the copy of the cache line from the home node.

16. The non-transitory computer-readable storage medium of claim 15, further comprising, when causing the valid copy of the cache line to be sent to the requesting node involves sending a forward message from the home node to a slave node, wherein the slave node has a valid copy of the cache line, and wherein the forward message causes the slave node to send the valid copy of the cache line to the requesting node, waiting for an acknowledgment indicating that the requesting node received the valid copy of the cache line before completing processing of the request.

17. The non-transitory computer-readable storage medium of claim 15, wherein if the requesting node receives an invalidation for a requested cache line, and then receives a copy of the requested cache line from the home node, the requesting node ignores the copy of the requested cache line and resends the request.

* * * * *